United States Patent [19]
Whiteley et al.

[11] Patent Number: 5,267,388
[45] Date of Patent: Dec. 7, 1993

[54] METHOD OF FORMING A LIGHTWEIGHT CYLINDER

[75] Inventors: John Whiteley, Clitheroe; Alfred Wood, Royton; Leslie Powdrill, Oswaldtwistle; Stephen W. Yates, Hawood, all of England

[73] Assignee: Hollingsworth U.K. Limited, Accrington

[21] Appl. No.: 915,220

[22] Filed: Jul. 20, 1992

Related U.S. Application Data

[63] Continuation-in-part of Ser. No. 664,080, Mar. 4, 1991.

[30] Foreign Application Priority Data

Mar. 5, 1990 [GB] United Kingdom ............... 9004850
Dec. 20, 1990 [GB] United Kingdom ............... 9027684

[51] Int. Cl.$^5$ ................................................ B23D 19/02
[52] U.S. Cl. ........................... 29/525; 428/36.9; 29/446
[58] Field of Search ............ 29/446, 525; 220/465; 428/54, 36.9, 60, 58; 52/224, 731, 588

[56] References Cited
U.S. PATENT DOCUMENTS 2,230,032  1/1941  Freyssinet ..................... 52/224
3,616,521  11/1971  Boggio ......................... 29/446
3,926,134  12/1975  Closner et al. ................ 220/465

FOREIGN PATENT DOCUMENTS

0094781A1  11/1983  European Pat. Off.
0494323  1/1937  United Kingdom .

Primary Examiner—Mark Rosenbaum
Assistant Examiner—Kenneth S. Hansen
Attorney, Agent, or Firm—Cort Flint; Henry S. Jaudon

[57] ABSTRACT

A modular cylinder comprises a plurality of, in this case 24, modules each having a tongue to engage a groove of its neighbour and each either having a camming ramp to engage a camming ramp of its neighbour, or a filler rod inserted between adjacent modules at each interface. Where the camming means are provided, (n - 1) of the modules defining an almost complete cylinder and can then be strained in a radially outward direction to provide space for the final module which is placed in position by sliding longitudinally of the gap. Where the filler rods are used, all of the n modules may be loosely assembled in a first operation and the filler rods can be inserted in a second operation to pre-stress the cylinder. First filler rods of undersized type may be installed to hold the array of a module in loosely assembled configuration, and these may then be sequentially replaced by correctly sized larger filler rods.

17 Claims, 7 Drawing Sheets

METHOD OF FORMING A LIGHTWEIGHT CYLINDER

CROSS REFERENCES TO RELATED APPLICATIONS

This is a continuation-in-part of copending application Ser. No. 07/664,080, filed Mar. 4 1991.

FIELD OF THE INVENTION

The present invention relates to a method of forming a lightweight cylinder construction which has structural rigidity but without being made from the solid.

PRIOR ART

Conventionally cylinders, particularly those used in heavy machinery such as textile cards, are produced from the solid, either by being cast in the form of a solid cylindrical metal block and possibly having been machined away to leave a hollow construction, or by having been cast in hollow form and subsequently machined internally and externally for finishing.

Previous efforts towards reducing the weight of such cylinders has involved the choice of lightweight metals for the casting, but there is a limit as to the weight reduction possible because of the eventual lack of structural rigidity which is necessary for precision equipment (for example cards where the clearance between the fine points on the card clothing wire on the cylinder and those of any cooperating concave carding plate and/or flats is critical to optimum uniformity of the carding action obtained).

British Patent Specification 0494323 (Riveau) discloses a cylinder for a rotary printing machine comprising a core having dove-tailed thereon a series of modules comprising a cylindrical jacket about the core and hence providing a substantially solid printing cylinder.

European Patent Application 0094781 Carding Specialists (Canada) Ltd discloses a "bend" for a textile card in which the bend is made up of individual segments which are not connected to one another but which are instead all mounted on a side flange of the side plate of the card. The card cylinder itself is shown in FIG. 4 as being solid, and in FIG. 1 the cylinder is hollow but supported on a spider. The annular structure forming the cylinder is apparently formed in a single piece as is conventional for carding cylinders.

OBJECTS OF THE INVENTION

It is a first object of the present invention to provide a method of forming a cylinder which is hollow but has a structural strength which is greater than possible hitherto with hollow cylinders.

It is a still further object of the present invention to provide a method of assembling a cylinder from a plurality of identical modules, with ease of stressing the cylinder so that on completion it is in a pre-stressed state.

It is a further object of the present invention to provide a method of forming a prestressed cylinder formed of a plurality of identical modules of lightweight construction which are self-locking to comprise the cylinder structure.

SUMMARY OF THE PRESENT INVENTION

In accordance with the present invention, there is provided a method of assembling a modular cylinder consisting of n identical modules in engagement in a cylindrical array, comprising assembling together (n−1) of said modules and leaving a gap for the final module, straining said array of (n−1) modules to increase the width of the gap remaining for the final module sufficiently to allow engagement of the final module with its immediate neighbours to either side of the gap, sliding the final module longitudinally into the gap until it is in register with the (n−1) modules of the array, and then relaxing the strain.

A second aspect of the invention provides a method of assembling a modular cylinder consisting of n identical modules in engagement in a cylindrical array, comprising assembling together the n-modules in a loose-fitting cylindrical configuration, and stressing said assembly by inserting filler means between the adjacent surfaces of the modules at each interface between the adjacent modules, said filler means fitting between the sidewalls of the modules near the radially outer panels defining the exterior of the cylinder, whereby insertion of the final said filler means stresses the cylinder in the required manner.

BRIEF DESCRIPTION OF THE DRAWINGS

In order that the present invention may more readily be understood the following description is given, merely by way of example, with reference to the accompanying drawings, in which.

DESCRIPTION OF THE PREFERRED EMBODIMENTS

Figure 1:
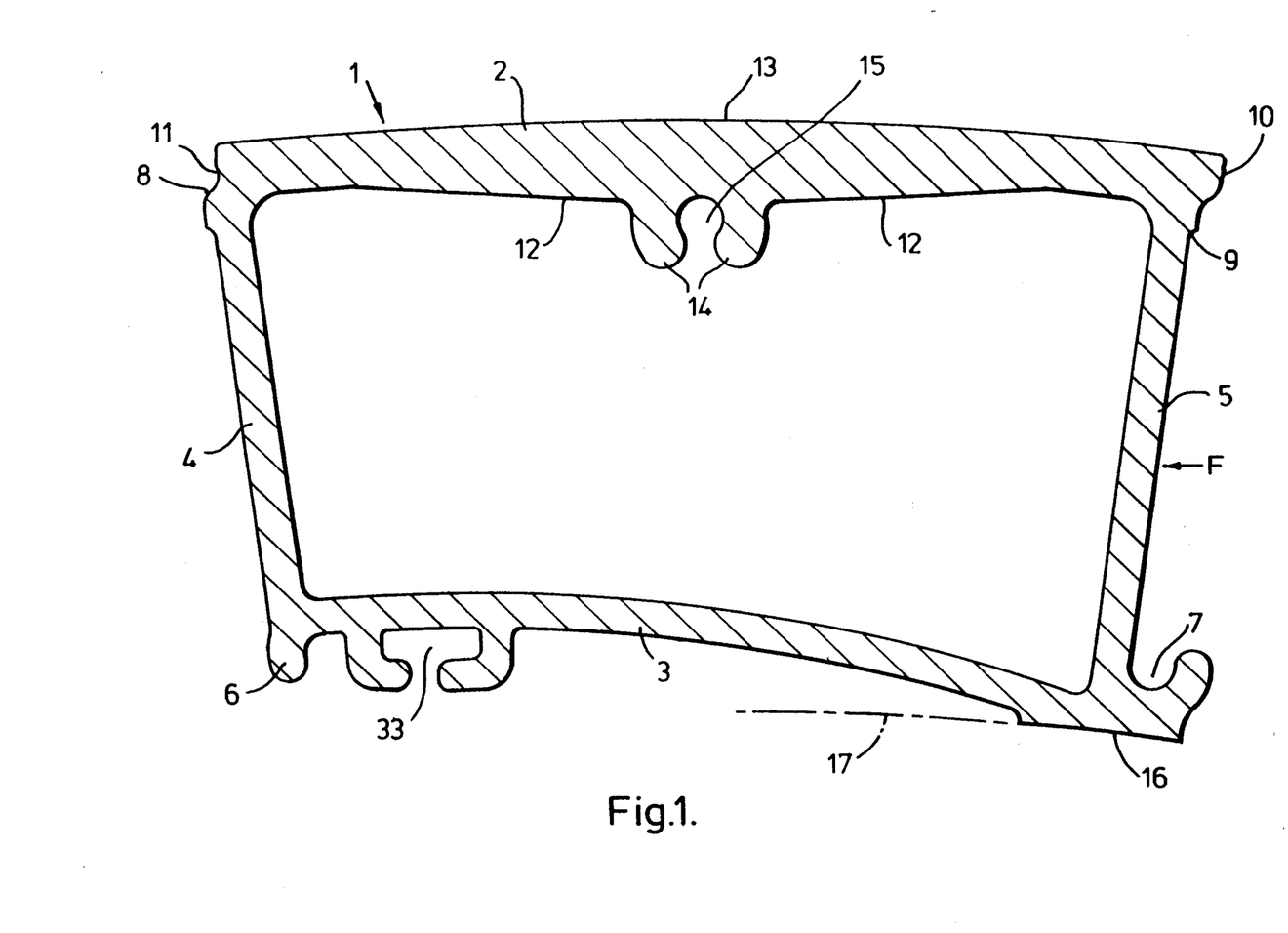
FIG. 1 is a transverse sectional view of a cylinder 5 module in accordance with the present invention.
Figure 3:
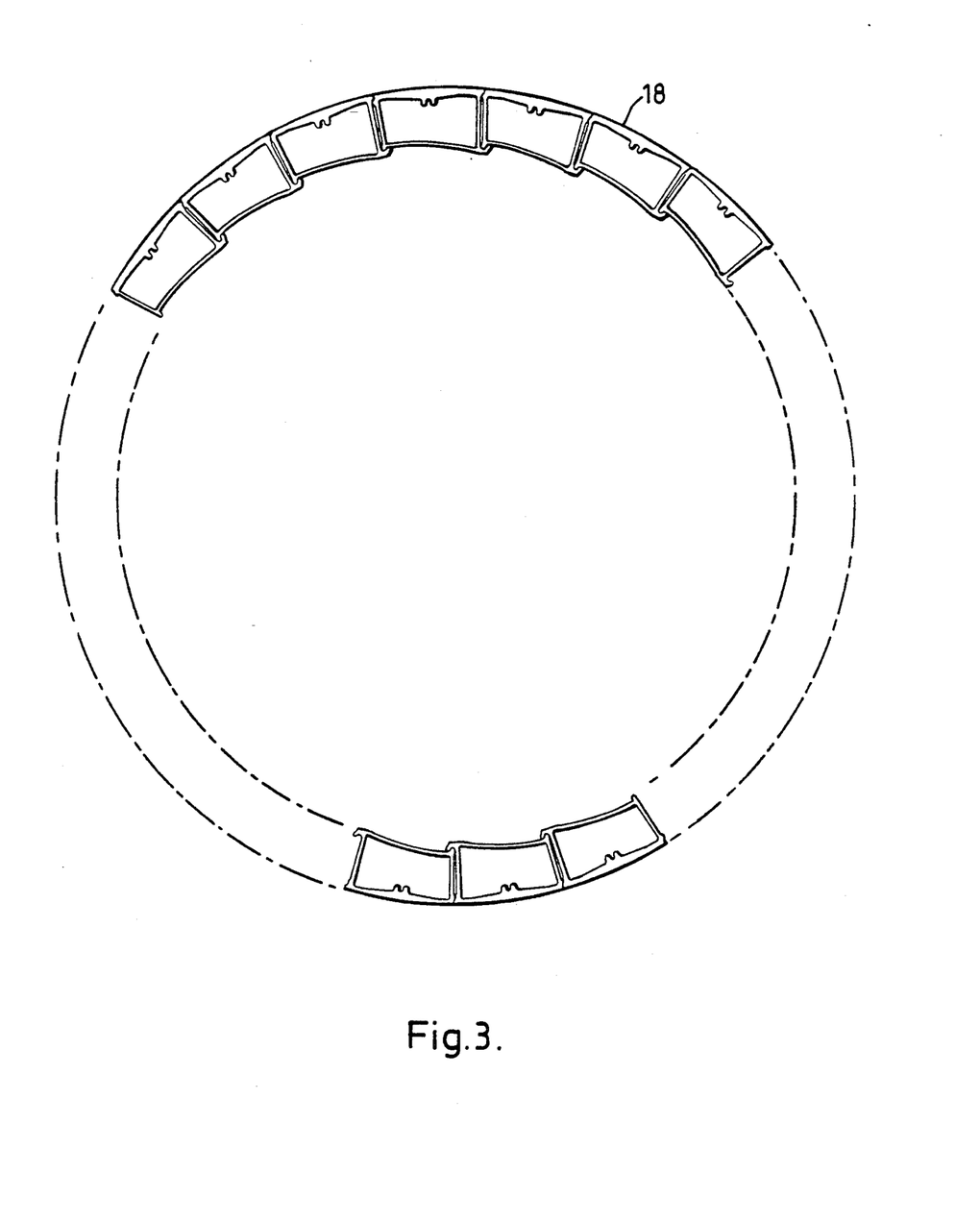
FIG. 3 is a still further reduced scale drawing showing the finished cylinder.

FIG. 1 shows a hollow extruded module 1 which is one of twenty four identical such modules to be used to assemble a hollow cylinder 18 shown in FIG. 3, in this case for use as the main carding cylinder of a textile fibre card.

The module is generally in the form of a box-section beam having an outer wall 2 which will define the exterior of the cylinder, and an inner wall 3 which will be facing radially inwardly of the assembled modular cylinder, these inner and outer walls being joined by generally radially extending sidewalls 4 and 5.

In the preferred embodiment the "beam" is closed except at its ends, but in practice any alternative construction providing an external surface of a desired configuration, and providing the necessary strength for the cylinder may be used.

Figure 2:
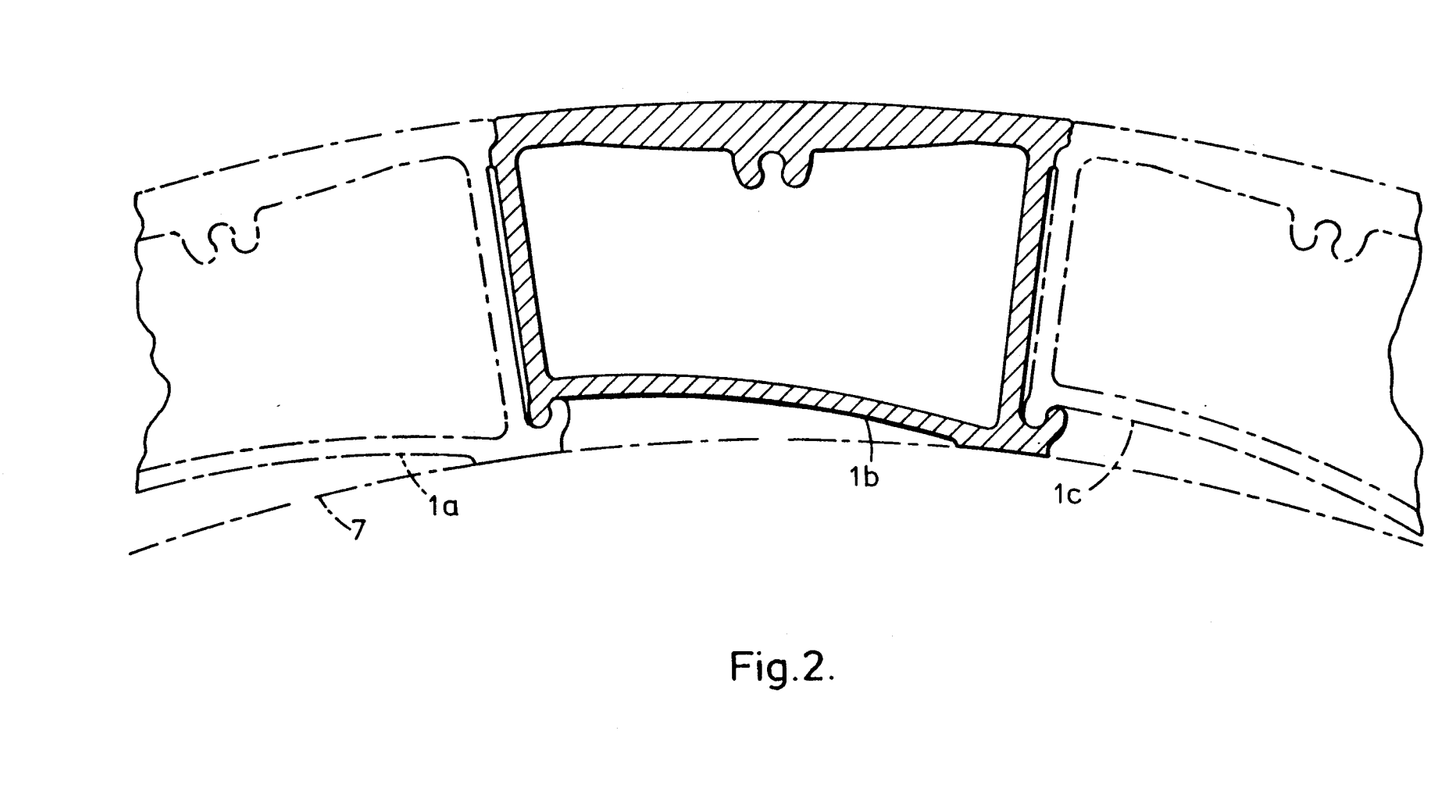
FIG. 2 is a view, on a reduced scale as compared with FIG. 1, showing three of the modules assembled in a part-cylindrical configuration.

In order to assemble the modules together, each has a tongue 6 at one end of the inner wall panel 3 and a suitably arranged recess 7 at the opposite end of that same wall panel 3, for the purposes of allowing the tongue 6 of one module 1a to engage in the recess or socket 7 of its immediate neighbour 1a, and so on, as shown in FIG. 2.

In order to ensure that the tongue 6 engages firmly in the socket or recess 7, the end of the sidewall 4 remote from the tongue 6 includes a camming ramp 8 which engages with a suitably positioned camming ramp 9 on the end of the other sidewall 5 remote from the socket 7. This has the result that when two adjacent modules 1a and 1b are pressed together by a force acting in the direction of the arrow F of FIG. 1 the camming engagement of the ramps 8 and 9 causes the tongue 6 to press firmly into the socket 7.

In order to ensure that there is no loose fit of the modules one against another, the profile of the tongue 6 is carefully chosen to conform to the profile of the socket 7 to avoid lateral slapping even in the unstressed condition of the modules.

In order to impose a circumferential compression on the assembled modular cylinder, the end of the sidewall 5 remote from the socket 7 has a projection 10 which bears against a shoulder 11 at the end of the other sidewall 4 remote from the tongue 6, as each two adjacent modules 1a and 1b are pressed against one another in the circumferential direction.

By suitable dimensioning of the distance measured in the circumferential direction between the rightwardly facing end of the projection 10 and the cooperating part of the shoulder 11, on the one hand, and the distance between centres of the tongue 6 and of the recess or socket 7, on the other hand, it is possible to ensure that in the assembled condition the wall 2 is maintained in compression while the wall 3 is maintained in tension. This is particularly advantageous when the assembled modular cylinder is to be wound around with a binding medium such as card clothing wire in the case of a carding cylinder.

In order to provide the necessary strength and buckling resistance to the radially outer wall panel 2 of each module, the panel 2 is preferably shaped as shown in FIG. 1 in that it has a generally inwardly convex inner surface 12 which complements the outwardly convex surface 13 defining the external surface of the assembled modular cylinder, in such a way that, despite the cylindrical exterior of its surface 13 the neutral axis of bending 31 (in FIG. 4) of that panel 2 is substantially straight and is in this case parallel to the tangent 32 to the external surface 13 of that module at the mid-point of the wall 2.

Each module optionally includes a pair of bent ribs 14 defining between them a generally circular recess 15 for a purpose to be described therebelow.

The operation of assembling the modules 1 to form a hollow cylinder with the ability to withstand structural loading is as follows:

Initially the various modules, such as 1a, 1b and 1c in FIG. 2, are placed in a suitable configuration (for example by standing them upright on the floor surface with one end of each module engaging the floor, or by mounting them on a suitable former ring or within a former socket) and the tongue 6 of one module 1b is engaged with the socket 7 of its neighbour 1a, and so on.

Figure 5:
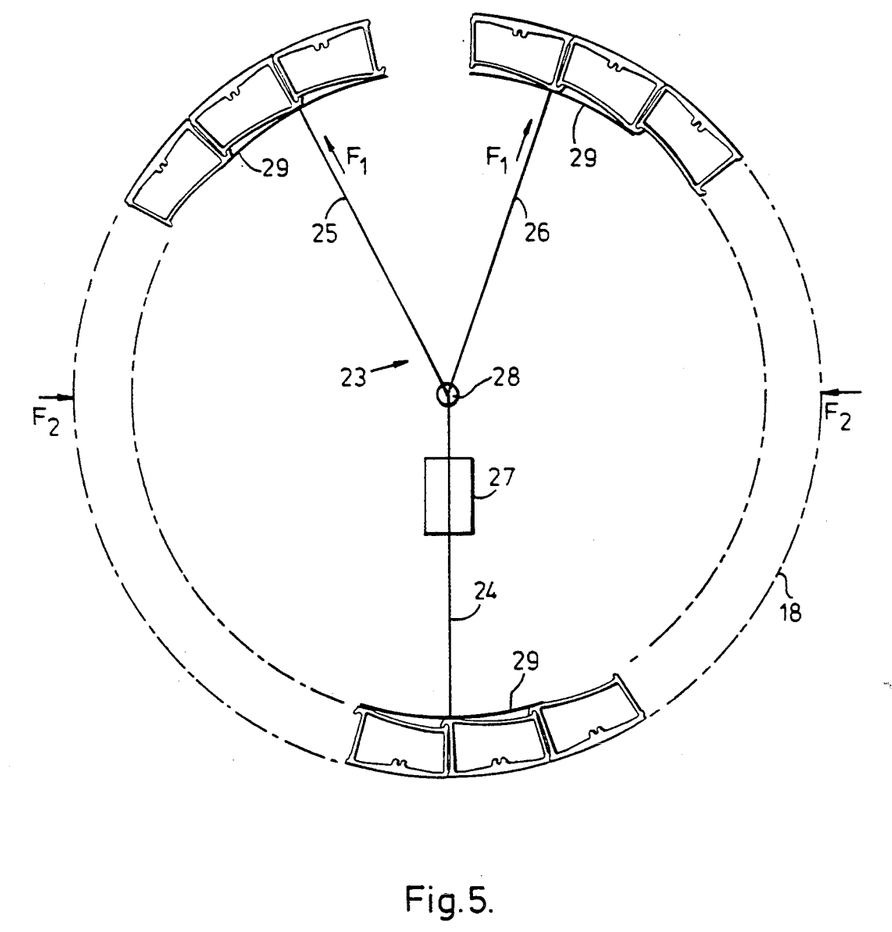
FIG. 5 is a diagrammatic view illustrating the method of assembling the cylinder comprising the modules of FIGS. 1 and 2.

After an incomplete set comprising twenty three of the twenty four modules has been assembled in this way, normally simply by positioning each one of them so that it engages with its tongue in the groove of its neighbour, the almost complete part-cylindrical set is then deformed by applying an outward strain at the ends of the set which will receive the sidewalls 4 and 5 of the missing module. Ideally some means, such as spreader 23 in FIG. 5, are provided for ensuring that the bending moment applied to the almost assembled modular cylinder is distributed uniformly over the entire cylinder. For this purpose there may be load spreading pads 24 or other similar means to apply a relatively uniform deflection around the peripheral direction of the modular cylinder.

While the almost complete cylinder is thus strained, the final module is placed in position by sliding it axially into the gap remaining, whereby its tongue 6 slides along the socket or recess 7 of one of its neighbours and its socket or recess 7 slides along the tongue 6 of the other neighbouring module until the final module is correctly aligned side-by-side with the other twenty three.

At this stage, release of the "opening" bending moment on the other twenty three modules will allow the twenty fourth module to take its share of the load which will be evenly distributed around the modular cylinder and hence the resulting engagement of the ramps 8 and 9 of the final module with its immediate neighbours will help to ensure a tight-fit of the tongues 6 and sockets 7 around the modular cylinder.

If desired, one or other or both of the tongue 6 and the socket 7 may have a slightly tapering profile in order to provide some form of wedging action as the tongue 6 is driven into a cooperating socket 7 as a result of the camming engagement of the ramps 8 and 9.

As an alternative to the preferred tongue and socket interconnection of the modules 1 illustrated, the modules may instead be provided with cooperating dovetailed formations.

FIG. 5 shows a suitable tool 23 for spreading the almost complete modular cylinder as, for example, comprising a Y-shaped spreader having the stem 24 of the Y engaging the interior of the almost complete modular cylinder (for example adjacent modules numbers 11 and 12 (where module number 1 is at one side of the gap and module number 23 is at the other side of the gap to receive module number 24)), and then the branches 25 and 26 of the Y may engage the radially inward surface of the modular cylinder adjacent modules numbers 1 and 23 to apply a radial expansion force $F_1$ thereagainst. A suitable hydraulic or screw jack 27 on the stem of the Y can be operated to spread the branches of the Y (preferably by having the branches pivotally connected to the stem of the Y at 28). Load spreading pads 24 are provided on the stem and branches. Preferably a transverse radial compression is applied (for example at modules 6 and 18 in this 24 module example) to exert a diametral compressive force $F_2$ to cause the faces of modules 1 and 23 to be presented at the best orientation to receive module 24 readily.

Once the modular cylinder has been assembled in this way, end plates may be attached. For example, in the embodiment shown in FIG. 1, the end plate may have twenty four clearance holes drilled near its periphery, each one receiving a suitable bolt or screw which penetrates the clearance hole and bites into the socket 15 between the bent ribs 14 on the inward side of the outer panel 2 of the module I (FIG. 1). For this purpose the sockets 15 are preferably tapped, by use of a suitable guiding fixture, before assembly of the modules to form the cylinder.

The centre of each end plate may provide means for mounting a bearing or stub axle on the cylinder, for the purposes of mounting the finished modular cylinder for rotation.

Although the above description refers to a modular cylinder comprising twenty four identical modules, any smaller or larger number of modules may be chosen, but of course the shape of each module will differ with such differing numbers of modules, even if the same general operating principle of the modules is followed.

FIG. 1 shows that there is a radially inwardly facing part-cylindrical surface 16 of each module which can engage an inner former ring, and that the main curved radially inwardly facing panel 3 of each module diverges from the cylindrical configuration of the finished modular cylinder as one moves away from the socket 7 and towards the tongue 6 of the module 1. The panels 3 are deliberately curved in order to allow the effect of straightening them, when the almost complete modular cylinder is strained by application of a bending moment to open the gap for the last module to be inserted, to impart extra flexibility for the straining to be facilitated in the appropriate direction of bending of the cylinder. The curvature of the panel 3 is generally spiral on the cross-section shown in FIGS. 1 and 2.

The general cylindrical notional cylinder of which the surface 16 forms part is illustrated in chain-dotted lines at 17. This will coincide with the exterior of the former ring 17, where fitted.

FIG. 2 shows the assembly of thee of the modules 1 of FIG. 1 in engagement with one another during the early stages of assembling a said cylinder 18. This clearly shows the irregular radially inner profile, resulting from the staggering of the tongues 6 and recesses 7, and the generally regular radially outer profile defined by the surfaces 13 of the three modules illustrated.

Figure 4:
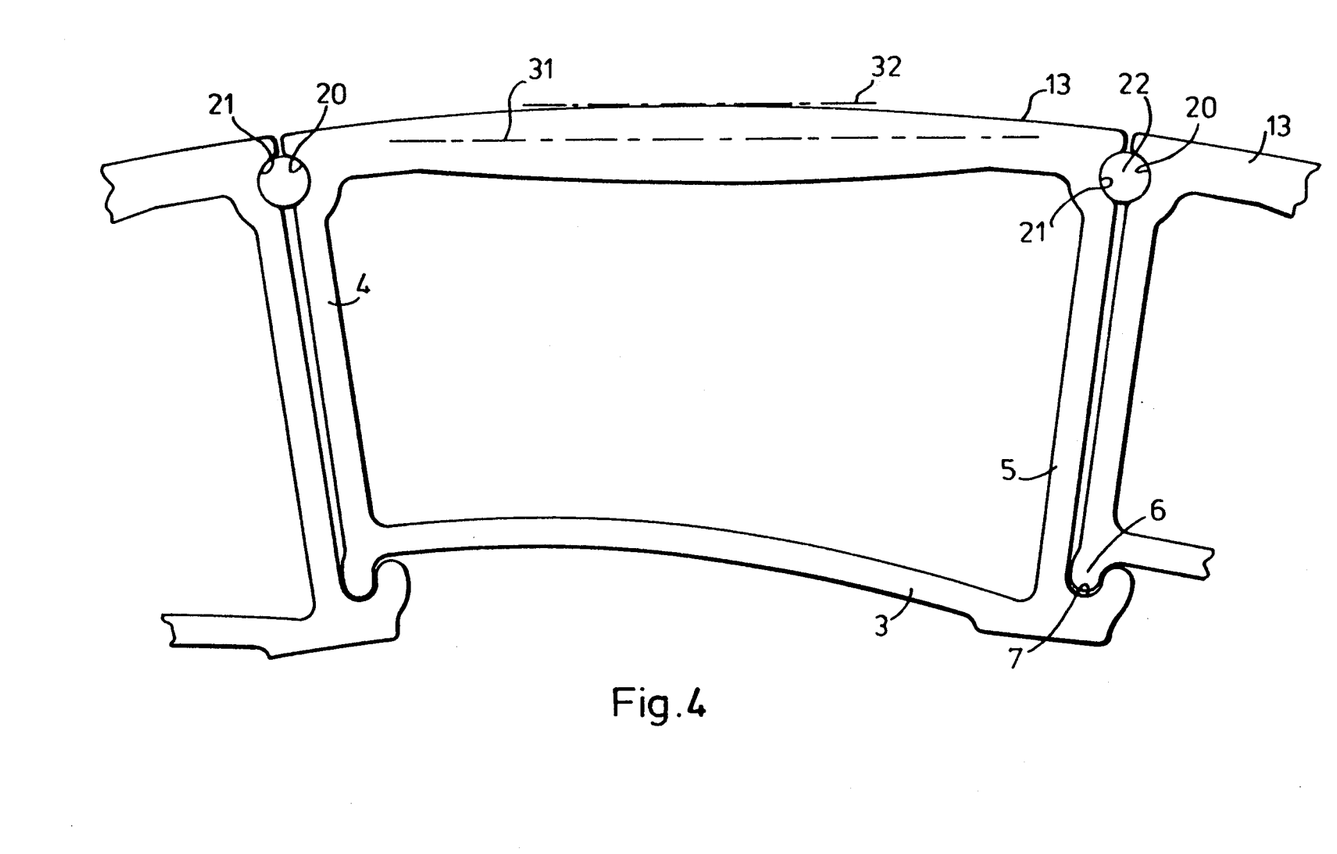
FIG. 4 shows a view corresponding to FIG. 2, but illustrating a modified form of the modules forming the cylinder.

FIG. 4 shows an embodiment of the cylinder module which is generally similar to that of FIGS. 1 to 3 but which has additional hemi-cylindrical recesses 20 and 21 along the side edges adjacent the radially outer panel 13 of the module. As shown in the central module in FIG. 4, the left-hand hemi-cylindrical recess is referenced 20 and the right-hand is referenced 21 such that, when the modules are assembled, the recess 21 to the right of the central module is in register with the other (lefthand) recess 20 of the next adjacent module on the right, and the left-hand recess 20 is in register with the other (right-hand) recess 21 of the next adjacent module on the left.

Although the recesses are shown as being hemi-cylindrical, they could be of any suitable form which can receive a filler which in the present embodiment is in the form of a cylindrical rod 22. With a cylindrical rod it is possible for the recesses 21 and 22 to be non-cylindrical but, for example, V-shaped. With other cross-sections of filler instead of the cylindrical rods 22 a different profile of recess 20 and 21 altogether may be used.

In order to assist insertion of the filler rods 22, they have one end tapered to assist in threading them into the registered recesses 20 and 21.

Another difference between the modules of FIG. 4 and those of FIGS. 1 to 3 is that there is no evidence of the bent ribs 14 to assist in clamping end plates to the modular cylinder. However, some other form of securing of the end plates may be incorporated. For example, the filler rods 22 could be used to mount end plates by having suitable turned-down ends to engage in holes drilled in the end plates.

The method of assembling the modular cylinder with the modules of FIG. 4 is somewhat different from that of FIGS. 1 to 3, and is as follows:

The entire assembly of modules is laid out in a cylindrical configuration with the modules standing up on end and the various tongues 6 and grooves 7 interengaged. With the radially outermost panels 13 of the modules arranged so that their edges almost touch at the interface between one module and the next the fit is relatively loose but the cylindrical configuration can be achieved without difficulty, even when the last module of the set is inserted into the available space. It will be recalled that with the embodiment of FIGS. 1 to 3 the insertion of the last module required the entire assembly of the previous (n−1) modules to be strained to make space for it.

Once the various modules have all been loosely assembled as described above, the various filler rods 22 are driven into the gaps defined by the registered recesses (in this case the cylindrical openings defined by the two hemi-cylindrical recesses 20 and 21 at each interface between modules).

In order to facilitate insertion of the rods, the loosely assembled cylinder may be distorted into an elliptical configuration either by expanding a diameter from within the cylinder (in order to cause that diameter to tend to become the major axis of an ellipse), or by contracting a diameter from outside to cause that contracted diameter to become the minor axis of an ellipse. When such an elliptical configuration has been achieved, rods are inserted around the ends of the major diameter, where the radius of curvature of the ellipse is smallest and the gaps between the surfaces 20 and 21 are widest. If a single "elliptical" deformation is not enough to facilitate insertion of all the rods, then this process may be repeated several times with different diameters chosen for contraction or expansion, in order to shift the regions of smallest radius of curvature of the assembly of segments around the array so as to generate the tightest curvature at a region where the rods have not yet been inserted.

Figure 6:
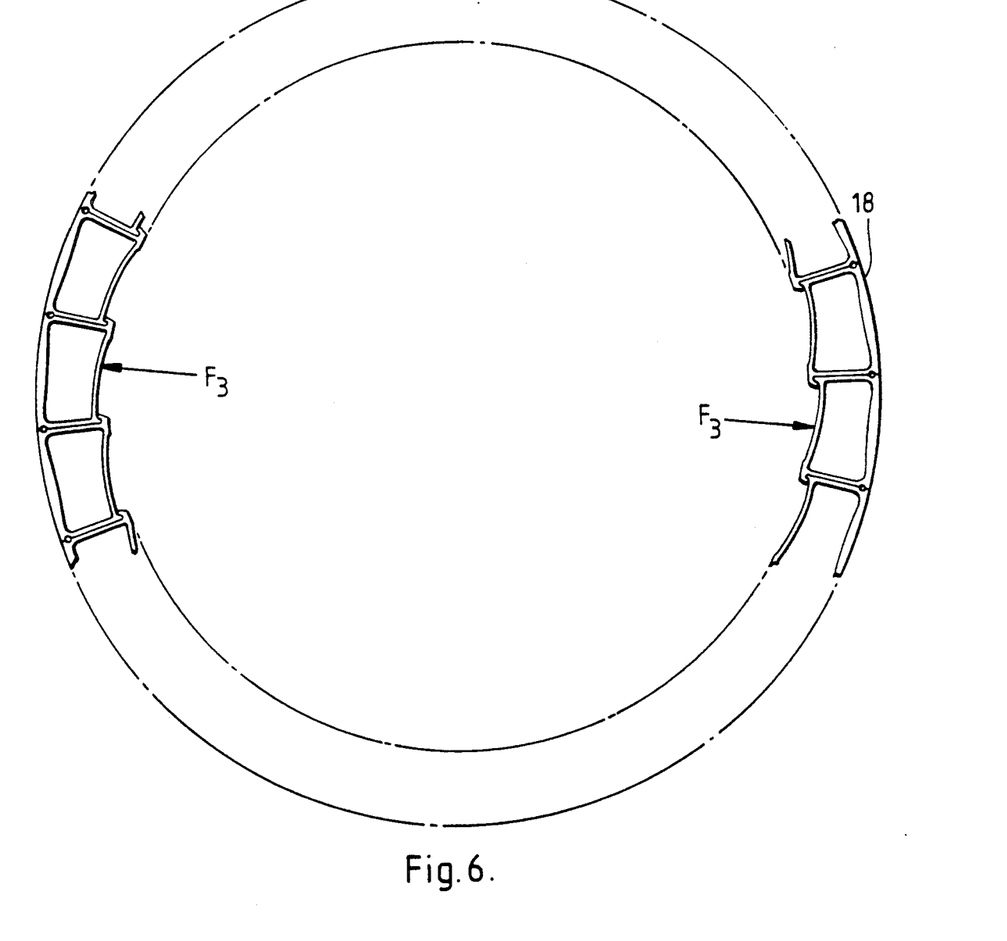
FIG. 6 is a view corresponding to FIG. 5, but showing the assembling of a cylinder comprising the modules of FIG. 4.

By way of example, FIG. 6 shows an outward deformation force $F_3$ applied at the 9 o'clock and 3 o'clock positions of the cylinder, so as to generate tightest curvature around those points of application of the internal force to facilitate insertion of the rods locally.

Alternatively, a radially inward force may be applied, for example at the 9 o'clock and 3 o'clock positions, in order to contract that diameter and to generate the tightest curvature at the 12 o'clock and 6 o'clock positions to facilitate insertion of the rods there.

Driving in the last rod will be difficult, but will be helped by virtue of the optional tapering of the leading end of the filler rod this can be achieved without difficulty.

Once the various filler rods 22 have been inserted, the radially outer panels 13 will all have been placed in compressive stress and it has been found that this is the configuration in which the cylinder preserves its structural integrity most reliably.

A modification of this particular method of assembly comprises inserting slightly undersized rods in all of the cylindrical passageways defined by the registered hemi-cylindrical recesses, so that the assembly of modules standing upright on the floor is able to maintain its integrity. Then each of the undersized filler rods 22 is removed and replaced by a larger rod of the appropriate final size. Again insertion of the last one or two rods will be difficult by virtue of the stressing of the cylinder, but can be facilitated by the tapering of the ends of the rods, but the existence of the undersized holding rods in each of the cylindrical passageways assist the method by maintaining the cylinder in a substantially integrated form even though capable of some relative displacement between adjacent modules to accept a correctly sized rod in replacement for the undersized rod just removed.

In the case of a carding cylinder manufactured by the method of the present invention, the outer panel 2 of each module will be thick enough to provide for the possibility of machining of the radially outwardly facing surface of the assembled modular cylinder 18 for the purposes of allowing precise dimensioning of the finished cylinder and for dressing the cylinder to receive the necessary card clothing wire. However, mere grinding of the radially outer surface may suffice for preparing the surface to receive carding wire.

As indicated above, the material used for each extruded module 1 is preferably aluminium or an aluminium alloy, and the hollow box-beam type construction allows a very lightweight module to be formed such that the engagement of the designed number of such modules to form a cylinder, with a radially outer compressive stressing and a radially inner tensile stressing of the finished modules, allows a particularly impressive structural integrity of the finished modular cylinder to be obtained despite the extreme light weight of the cylinder as compared with the conventional carding cylinder using a hollow cylindrical casting which has a radial distance substantially equal to the length of a sidewall 4 or 5 of the module 1.

If desired, such a modular cylinder may be reinforced by at least one radially inwardly arranged reinforcement hoop (not shown) which has its cylindrical exterior conforming to the notional cylindrical interior 17 of the modular cylinder, and in this way the modules can be braced against radial deformation in that the tension in the inwardly facing module panels 3 of the cylinder 18 can be responsible for applying compression to the exterior of the reinforcement hoop, provided appropriate measures are taken during assembly to ensure that there is a tight fit upon relaxation of the modular cylinder 18 and the reinforcement hoop.

If absolutely necessary, more than one such reinforcement may be employed.

If desired, each module extrusion may include at least one section such as is shown at 33 in FIG. 1 to enable the radially inner panels of the modules to be drawn tightly radially inwardly against the reinforcement hoop by means of T-headed bolts and nuts as will be described later with reference to FIG. 7.

An alternative or additional reinforcement mechanism relies on the injection of a rigid polyurethane foam into the cavities bounded by each module 1.

In order to hold the loosely-assembled hollow modules in the correct axial registration, it may be advantageous to provide notches extending down the side walls of the modules along what would be radii of the finished cylinder, and to insert dowels into the space defined by the registered notches when the correct axial alignment has been obtained. This may either be carried out by previously notching the modules, or by assembling the modules in a particular configuration and then drilling along a radial direction at each interface so as to provide a bore having the appropriate calibre to receive the dowels.

When the assembly operation is complete, the space around each dowel may be filled with a resin or any other filling medium, prior to the step of grinding the external surface of the hollow cylindrical body, so that the grinding operation results in a smooth cylindrical surface, even at the location of a radially extending dowel.

Figure 7:
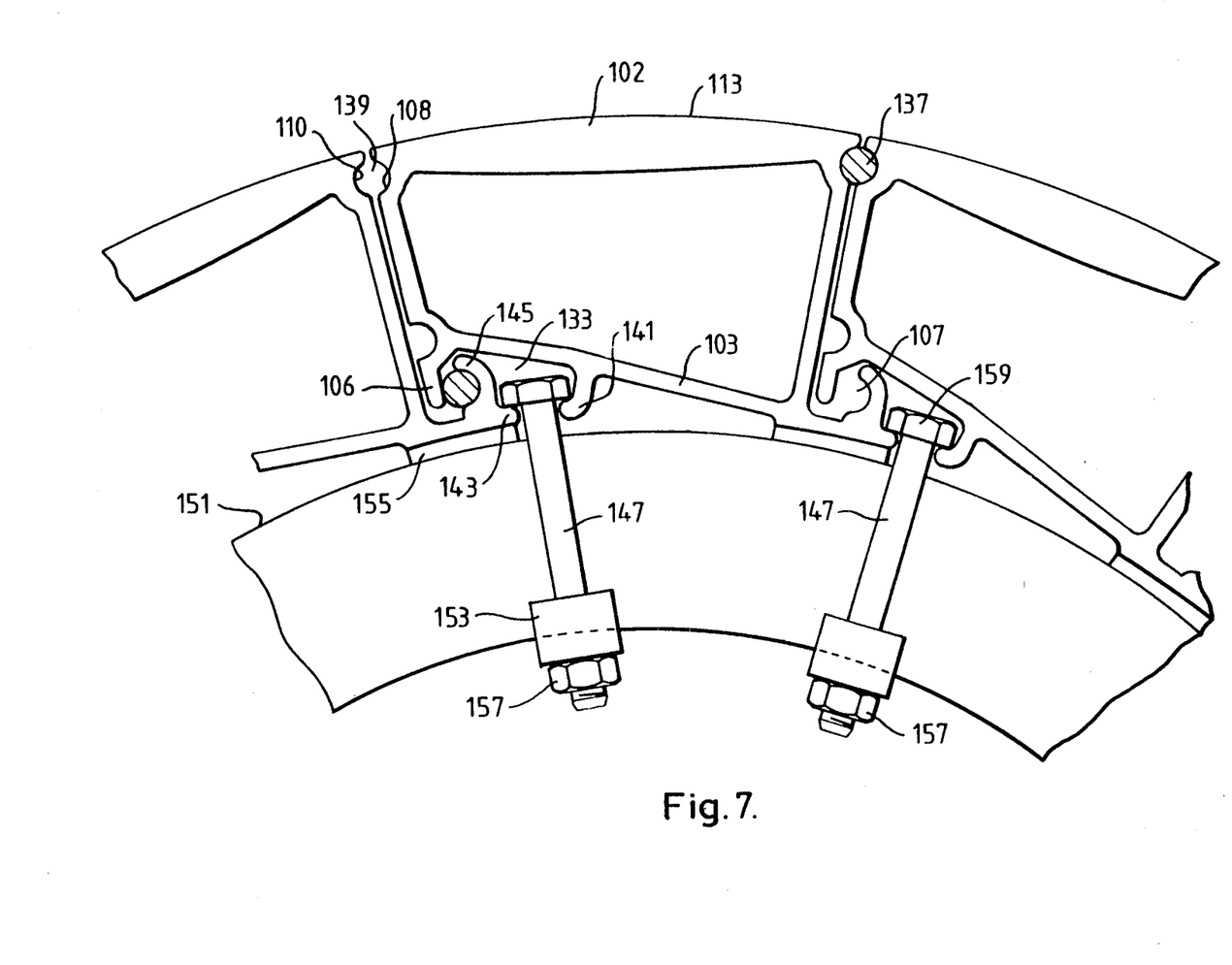
FIG. 7 is a view similar to FIG. 4, but showing a still further form of the invention.

FIG. 7 shows a further modified form of the cylinder in which there are filler rods 135 and 137 both at the radially inner side of the array and at the radially outer side of the array of modules 102.

As shown in FIG. 7, at the radially inner side of the space between two adjacent modules is a passageway 107 defined between a radially inwardly depending rib 106 at the left hand end of one module cross-section, and a hooked generally radially outwardly extending portion 145 at the right hand end of the next adjacent identical module profile on the left of the one just mentioned. When a filler rod 135 of the appropriate size is force into the passageway 107, the pair of modules becomes stressed in such a way that the curvature of the assembly of modules becomes more pronounced.

Otherwise, the radially inner panel 103 of the module 102 is generally the same as that disclosed in the earlier embodiments, with the exception that the T-shaped recess, here referenced 133, analogous to the recess 33 in FIG. 4 is here defined between the tip of a J-shaped radially inwardly extending rib 141 of one module and a claw 143 formed on the exterior of the hooked generally radially outwardly extending portion 145 of the next adjacent module on the left. Once all the adjacent modules 102 have been fastened together by insertion of the necessary filler rods 135 and 137, all of the recesses 133 will be of the same size.

At the radially outer side of the gap between two adjacent modules 102 is a cylindrical passageway 139 formed between a hemi-cylindrical recess 110 at the right hand end of one of the modules 102 and a similar hemi-cylindrical recess 108 at the left hand end of the panel 113 of the next adjacent module on the right of the one just mentioned. Insertion of a filler rod 137 in the cylindrical passageway 139 has the result of increasing the compressive stress in the outer panels 113 of the segmented lightweight cylinder made by the method of the invention.

As in the previous embodiments, the chain-dotted line 117 indicates the radially inner surface defined by the array of interengaged modules 102.

The preferred method of assembling the modules shown in FIG. 7 comprises installing undersized holding rods in the various cylindrical passageways 107 and 139 in order to maintain the assembly of modules 102 loosely held together, and then replacement of the holding rods sequentially by correctly sized filler rods.

In a more preferable form of the assembly method, the final internal radius of the assembly of modules can be adjusted at will by selection of one of several possible sizes for the radially inner filler rods 135. The larger diameter filler rods 135 give rise to a smaller diameter cylinder, and vice versa.

Once the correct dimension of radially inner filler rods 135 has been fitted, the variation in diameter of the radially outer filler rods 137 by appropriate selection of one of several sizes of rod enables the degree of compressive pre-stressing of the outer panels 102 of the modules to be varied in that the larger the diameter of the filler rod 137 the more compressive stress is imposed on the outer panel 102.

As with the earlier embodiments, the process is finished by grinding the exterior of the cylinder.

The cylinder produced by the method in accordance with the present invention has general application, and even several possible uses among those selected from the textile field. For example, although the earlier embodiments have been described as being used for the carding cylinder of carding apparatus, it is equally possible for the structure to be used for the doffer of the carding apparatus, or for any other normally relatively massive cylinder. The structure of FIG. 7 is particularly suitable for use as the doffer.

FIG. 7 also shows the way in which the inner hoop or reinforcing ring can be attached to the already assembled modular cylinder.

There are several brackets 153, each drilled to receive a tie bolt 147, hooked loosely over the inner periphery of the hoop 151.

The hoop 151 is deliberately undersized in relation to the inner surfaces of the modular cylinder, in order to require slipper plates 155 to be inserted between the modules and the exterior of the hoop 151 to take up the clearance.

The undersizing of the hoop allows it to be readily installed in position, without friction against the inside of the modular cylinder, and with the various tie bolts 147 already inserted in the brackets 153 and unscrewed to an extent which allows the heads of the bolts 147 to fit loosely in and slide along the recesses 133 destined to receive them.

Inserting the slipper plates 155 may require some force in order to insert the very last one or two slipper plates, possibly by hammering them into position. The earlier-inserted slipper plates can all be inserted manually.

Once all the slipper plates are in position the nuts 157 on the various tie bolts 147 are tightened in order to pull the bolt heads 159 radially inwardly to grip the edges of the recesses 133 therefor.

Once the various nuts 157 have been tightened the cylinder can be checked for ensuring that it has not been distorted by the tightening operation, and then the surface finishing of the cylinder can be carried out in the manner described above.

Any number of such hoops may be introduced without requiring any modification of the extruded modules.

We claim:

1. A method of assembling a modular cylinder consisting of at least two identical modules in a cylindrical array, and interengaging adjacent said modules with one another to provide structural integrity of said cylindrical array, comprising the steps of:
   (a) assembling together an incomplete set of said modules in a part-cylindrical configuration, and interengaging adjacent ones of said assembled modules, of said incomplete set of said modules comprising one less modules than required for completing said array, and leaving a gap for a final module needed to complete the array,
   (b) applying strain to said incomplete set of modules in a direction radially of the part-cylindrical configuration to increase the width of the gap remaining for the final module sufficient to allow engagement of the final module with the two modules immediately adjacent it to either side of the gap,
   (c) sliding said final module longitudinally into the gap until it is in register with, and interengaged with, said modules of the previously incomplete set, and then
   (d) relaxing said radially applied strain.

2. A method according to claim 1, wherein said radially applied strain is applied to the incomplete set of modules by application of a deforming jack in the interior of the part-cylindrical configuration of modules to engage modules adjacent either side of the gap remaining for said final module.

3. A method of assembling a modular cylinder consisting of at least two identical modules in a cylindrical array, and interengaging adjacent said modules with one another to provide structural integrity of said cylindrical array, comprising the steps of:
   (a) assembling together an incomplete set of said modules in a part-cylindrical configuration, and interengaging adjacent ones of said assembled modules, of said incomplete set of said modules comprising one less modules than required for completing said array, and leaving a gap for a final module needed to complete the array,
   (b) applying strain to said incomplete set of modules in a direction radially of the part-cylindrical configuration to increase the width of the gap remaining for the final module sufficient to allow engagement of the final module with the two modules immediately adjacent it to either side of the gap,
   (c) applying diametral contraction along a diameter which extends substantially perpendicular to a diameter which in said cylindrical array will intersect said final module,
   (d) sliding said final module longitudinally into the gap until it is in register with, and interengaged with, said modules of the previously incomplete set, and then
   (e) relaxing said radially applied strain.

4. A method of assembling a modular cylinder consisting of at least two identical modules in engagement in a cylindrical circumferentially extending array, said modules including means which co-operate with corresponding means on an adjacent identical module to hold said modules in said cylindrical array, such method comprising the steps of:
   (a) assembling together the array of said modules in a loose-fitting cylindrical configuration, in which each said module has a radially inner panel and a radially outer panel, and in which each pair of adjacent modules has (i) adjacent side walls extending generally radially of said loose-fitting cylindrical configuration and centrally of said pair of modules, and (ii) adjacent surfaces to said adjacent side walls; and
   (b) applying circumferential compressive stress to said loose-fitting array by inserting respective ones of a set of filler means between said adjacent surfaces of said side walls of the modules at each interface between the adjacent modules, the respective said filler means of said set fitting between the sidewalls of the modules near the radially outer panels which define the exterior of the cylinder, whereby insertion of a last said filler means to complete said set stresses the cylinder compressively.

5. A method according to claim 4, wherein the side walls of all of said modules include external surfaces with recesses adjacent said radially inner panel of the module, and said filler mean comprising cylindrical rods adapted to be driven into the space between registering said recesses at each interface.

6. A method according to claim 5, wherein each of said cylindrical rods has a tapered end to facilitate insertion into said spaces.

7. A method according to claim 5, comprising selecting said filler means from a range of several sizes which permits variation of the final internal diameter of the array of modules.

8. A method according to claim 4, wherein the modules all include first recesses in the external surfaces of their side walls adjacent said radially outer panel of each module and second recesses in said external surface adjacent the radially inner panel of each module, said first recesses of each pair of adjacent modules being in register with one another, and said second recesses of each pair of adjacent modules being in register with one another, and wherein said filler means comprise first cylindrical rods adapted to be driven into the space between registering said first recesses at each interface, and second cylindrical rods adapted to be driven into the space between registering said second recesses at each interface.

9. A method according to claim 4, wherein each of said modules includes on its radially inner side recesses to receive means which, in the assembled configuration of the modules, extend radially of the modular cylinder, and including the step of inserting, internally of said assembled array, at least one bracing ring including a plurality of radially outwardly extending T-headed bolts each of which has its head engaging in an appropriate one of said T-shaped recesses and its shank engaging means hooked over the main periphery of said bracing ring, whereby said bracing ring provides reinforcing mounting means for said cylinder.

10. A method according to claim 9, wherein said cylinder has axial ends provided with rotary bearings, and said step of inserting at least one ring within the assembled array comprises assembling two said rings as end plates to support said rotary bearings for the finished cylinder.

11. A method according to claim 4, wherein the modules all include recesses in the external surfaces of their sidewalls adjacent said radially outer panel of each module, and said filler means comprise cylindrical rods adapted to be driven into the space between registering said recesses at each interface.

12. A method according to claim 11, wherein each of said cylindrical rods has a tapered end to facilitate insertion into said spaces.

13. A method according to claim 11, comprising selecting said filler means from a range of sizes which permits variation of the degree of pre-stressing of the radially outer panel of each module in the finished array.

14. A method according to claim 4, wherein said modules all include recesses in the external surfaces of their said side walls, and the step of loosely assembling the modules in a loose-fitting cylindrical configuration comprises inserting in said space between registering said recesses at each interface filler means of a size smaller than the final size required to stress the assembly of modules, and subsequently replacing each of said filler means of the first size by filler means of a larger second size until all of said first size filler means have been replaced and the cylinder is assembled in stressed form.

15. A method according to claim 4, wherein said step of assembling together the modules in a loose-fitting cylindrical configuration comprises arranging the modules in a cylindrical configuration upstanding on a flat surface, and inserting at each interface filler means of a first size smaller than the filler means required to stress the cylinder, and wherein said step of stressing said assembly comprises subsequently inserting filler means of the desired final size between the adjacent surfaces of the modules by replacing sequentially the filler means of the first smaller size by filler means of the larger final size.

16. A method of assembling a modular cylinder consisting of at least two identical modules in engagement in a cylindrical circumferentially extending array, said modules including means which co-operate with corresponding means on an adjacent identical module to hold said modules in said cylindrical array, such method comprising the steps of:

(a) assembling together the array of said modules in a loose-fitting cylindrical configuration, in which each said module has a radially inner panel and a radially outer panel, and in which each pair of adjacent modules has (i) adjacent side walls extending generally radially of said loose-fitting cylindrical configuration and centrally of said pair of modules, and (ii) adjacent surfaces to said adjacent side walls; and (b) applying circumferential compressive stress to said loose-fitting array by inserting respective ones of a set of filler means between said adjacent surfaces of said side walls of the modules at each interface between the adjacent modules, the respective said filler means of said set fitting between the sidewalls of the modules near the radially outer panels which define the exterior of the cylinder, whereby insertion of a last said filler means to complete said set stresses the cylinder compressively;

wherein the step of inserting said set of filler means comprises deforming the cylindrical array of loosely assembled modules into a configuration of an ellipse having a major axis, and insert said filler means in the vicinity of the ends of said major axis of the ellipse.

17. A method according to claim 16, comprising deforming the cylindrical array of loosely assembled modules into the configuration of an ellipse having a major axis, by application of a radially outward force to expand a diameter of said cylindrical array to form said major axis of said ellipse coincident with said diameter of the cylindrical array.

* * * * *